(12) United States Patent
kaminade et al.

(10) Patent No.: US 11,597,401 B2
(45) Date of Patent: Mar. 7, 2023

(54) DRIVING ASSISTANCE APPARATUS FOR ERRONEOUS ACCELERATOR PEDAL OPERATION

(71) Applicant: TOYOTA JIDOSHA KABUSHIKI KAISHA, Toyota (JP)

(72) Inventors: Takuya kaminade, Okazaki (JP); Masashi Oishi, Owariasahi (JP); Takashi Unigame, Kasugai (JP); Yuhi Kishimoto, Toyota (JP); Yoichi Iwata, Nagoya (JP); Asuka Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 17/116,003

(22) Filed: Dec. 9, 2020

(65) Prior Publication Data
US 2021/0197844 A1 Jul. 1, 2021

(30) Foreign Application Priority Data
Dec. 25, 2019 (JP) .............................. JP2019-234910

(51) Int. Cl.
B60W 50/10 (2012.01)
B60W 50/00 (2006.01)

(52) U.S. Cl.
CPC ........ B60W 50/10 (2013.01); B60W 50/0098 (2013.01); B60W 2520/10 (2013.01); B60W 2540/10 (2013.01); B60W 2710/06 (2013.01)

(58) Field of Classification Search
None
See application file for complete search history.

(56) References Cited

U.S. PATENT DOCUMENTS

| | | | |
|---|---|---|---|
| 2012/0191313 A1 | 7/2012 | Miyahara | |
| 2012/0209488 A1* | 8/2012 | Nagaya | B60W 10/06 701/70 |

(Continued)

FOREIGN PATENT DOCUMENTS

| | | |
|---|---|---|
| JP | 2014031153 A | 2/2014 |
| JP | 2014156140 A | 8/2014 |

(Continued)

OTHER PUBLICATIONS

Tanaka, Drive Control Device (Translation of "WO 2013046905 A1"), Apr. 4, 2013, all. (Year: 2013).*

*Primary Examiner* — James J Lee
*Assistant Examiner* — Tawri M Matsushige
(74) *Attorney, Agent, or Firm* — Dickinson Wright, PLLC

(57) ABSTRACT

A driving assistance apparatus makes a drive force of a vehicle equal to an erroneous operation coping drive force which is smaller than an ordinary drive force in a period from a satisfaction of an erroneous operation start condition which is satisfied when an accelerator pedal is operated erroneously to a satisfaction of an erroneous operation end condition which is satisfied when the erroneous operation has ended. The erroneous operation coping drive force is set to a first drive force if the erroneous operation start condition becomes satisfied after a reoperation determination time point at which a time threshold elapses from when the erroneous operation end condition became last satisfied. Meanwhile, the erroneous operation coping drive force is set to a second drive force which is greater than the first drive force if the erroneous operation start condition becomes satisfied before the reoperation determination time point.

4 Claims, 8 Drawing Sheets

(56) References Cited

U.S. PATENT DOCUMENTS

| | | | |
|---|---|---|---|
| 2013/0041564 A1* | 2/2013 | Doi | B60W 50/087 |
| | | | 701/70 |
| 2013/0131945 A1* | 5/2013 | Kimura | B60W 10/06 |
| | | | 701/70 |
| 2015/0274179 A1* | 10/2015 | Inoue | B60W 50/12 |
| | | | 701/70 |
| 2016/0209841 A1* | 7/2016 | Yamaoka | B60W 60/0057 |
| 2017/0043770 A1* | 2/2017 | Sudou | B60W 30/0956 |
| 2018/0037215 A1* | 2/2018 | Otake | B60K 28/06 |
| 2018/0037235 A1* | 2/2018 | Otake | B60W 30/12 |

FOREIGN PATENT DOCUMENTS

| | | | |
|---|---|---|---|
| JP | 2018131069 A | 8/2018 | |
| WO | WO-2013046905 A1 * | 4/2013 | B60K 28/00 |

* cited by examiner

DRIVING ASSISTANCE APPARATUS FOR ERRONEOUS ACCELERATOR PEDAL OPERATION

TECHNICAL FIELD

The present disclosure relates to a driving assistance apparatus which decreases a drive force of a vehicle when it is determined that an accelerator pedal is erroneously operated.

BACKGROUND

A conventionally known driving assistance apparatus (hereinafter also referred to as the "conventional apparatus") of this kind determines whether or not a driver of a vehicle performs an operation (hereinafter, also referred to as an "accelerator operation") to an accelerator pedal erroneously (mistakenly). Hereinafter, the accelerator operation performed erroneously is also referred to as an "accelerator erroneous operation"). The accelerator erroneous operation occurs, for example, when the driver erroneously operates (depresses) a brake pedal instead of the accelerator pedal in a case where he/she intends to rapidly decelerate the vehicle.

When it is determined that the accelerator erroneous operation has occurred, the conventional apparatus executes a process (hereinafter, also referred to as a "drive force suppressing (restricting) processing") for making a drive force of the vehicle smaller as compared with a case where it is not determined that the accelerator erroneous operation has occurred (namely, the driver operates the accelerator pedal according to the driver's intention). In addition, the conventional apparatus does not execute the drive force suppressing processing again for a time period from an end time point when the accelerator erroneous operation ends to a time point when a predetermined time elapses form the end time point.

Accordingly, when it is determined that the accelerator operation performed by the driver to accelerate the vehicle according to the driver's intention is the accelerator erroneous operation, the driver can accelerate the vehicle by ending the accelerator operation temporarily and thereafter restarting the accelerator operation again (see, for example, Japanese Patent Application Laid-Open (kokai) No. 2014-31153).

SUMMARY

However, when the driver performs the accelerator erroneous operation despite of the driver's intention to rapidly decelerate the vehicle, the driver may panic because a brake force of the vehicle is not generated, and therefore, a case where the driver ends the accelerator operation temporarily and erroneously starts the accelerator operation again in order to decelerate the vehicle may occur. In this case, according to the conventional apparatus, the vehicle accelerates rapidly, against the driver's intention to generate the brake force of the vehicle.

In view of the forgoing, one object of the present disclosure is to disclose a driving assistance apparatus that can prevent a vehicle from being rapidly accelerated when the accelerator erroneous operations occur repeatedly, and reduce a possibility that a driver feels a strong sense of discomfort (strangeness) since the vehicle does not accelerate although the driver performs the accelerator operation according to the driver's intention to accelerate the vehicle.

A driving assistance apparatus for achieving the above-described object (hereinafter also referred to as "the apparatus of the present disclosure") comprises an accelerator pedal, an accelerator operation amount sensor, and a control unit. The control unit may be implemented by at least one programmed processor whose operation is determined by a predetermined program, gate arrays and the like.

The accelerator pedal (81) is operated by a driver of a vehicle (10).

The accelerator operation amount sensor (62) is configured to detect an accelerator operation amount (Ap) which is an operation amount of the accelerator pedal.

The control unit (drive assistance ECU 21, drive assistance ECU 23) is configured to control a drive force generating apparatus (engine 51) which generates a drive force (drive torque Dt) of the vehicle to thereby change the drive force.

In addition, the control unit is configured to determine, based on the accelerator operation amount, whether a predetermined "erroneous operation start condition" becomes satisfied ("Yes" determination in step 530 of FIG. 5), the erroneous operation start condition being a condition to become satisfied when there is a probability that the driver has performed an erroneous operation to the accelerator pedal. The control unit is configured to determine, based on the accelerator operation amount, whether a predetermined "erroneous operation end condition" becomes satisfied in a case where the erroneous operation start condition has been determined to become satisfied ("Yes" determination in step 565 of FIG. 5), the erroneous operation end condition being a condition to become satisfied when there is a probability that the erroneous operation to the accelerator pedal has ended. The control unit is configured to control the drive force generating apparatus such that the drive force coincides with an "ordinary drive force" (required acceleration Dre obtained on the basis of a required acceleration map of FIG. 2) which varies depending on the accelerator operation amount during an "ordinary period" other than an "erroneous operation period" which is a period from a time point when the erroneous operation start condition becomes satisfied to a time point when the erroneous operation end condition becomes satisfied. The control unit is configured to control the drive force generating apparatus such that the drive force coincides with an "erroneous operation coping drive force" (limitation acceleration Ddc) which is smaller than the ordinary drive force during the erroneous operation period.

Furthermore, the control unit is configured to set the erroneous operation coping drive force to a "first drive force" in a case where the erroneous operation start condition becomes satisfied after a reoperation determination time point at which a predetermined time threshold (second time threshold Tth2) elapses from a time point when the erroneous operation end condition became last satisfied (step 615 of FIG. 6). The control unit is configured to set the erroneous operation coping drive force to a "second drive force" which is greater than the first drive force in a case where the erroneous operation start condition becomes satisfied before the reoperation determination time point (step 625 of FIG. 6).

In other words, when the apparatus of the present disclosure executes the drive force suppressing processing, the drive force of when a specific condition described later is satisfied is made to be greater than the drive force of when the specific condition is not satisfied. The specific condition is a condition to be satisfied at least when the erroneous operation start condition becomes satisfied before the time threshold elapses after the erroneous operation end condition became last satisfied. The specific condition is designed to become satisfied when the accelerator erroneous operations has occurred repeatedly (namely, when the accelerator erroneous operation has occurred again within a short time period after the accelerator erroneous operation was canceled (resolved)). The specific condition that has been satisfied becomes unsatisfied when the erroneous operation end condition becomes satisfied.

The ordinary drive force is, for example, set to a value which becomes larger as the accelerator operation amount becomes larger. The first drive force is, for example, set to "0." The second drive force is, for example, set to a value greater than "0" and smaller than the ordinary drive force.

Therefore, the apparatus of the present disclosure can prevent the vehicle from rapidly being accelerated when the accelerator erroneous operations has occurred repeatedly within a short time period. In addition, even if the (first) accelerator operation performed by the driver according to the driver's intention to accelerate the vehicle is determined to be the accelerator erroneous operation, the acceleration of the vehicle can be larger when the subsequent accelerator operation according to the driver's intention to accelerate the vehicle is performed, as compared with the case where the first accelerator operation was performed. Accordingly, it is possible to reduce the possibility that the driver feels a strong sense of discomfort due to an event that the vehicle does not accelerate when the driver performs the accelerator operation according to the driver's intention to accelerate the vehicle.

In one aspect (a first aspect) of the apparatus of the present disclosure, the control unit is configured to set the second drive force to a value equal to the first drive force in a case where a travelling speed of the vehicle is greater than a predetermined upper limit speed (Vu).

According to the above first aspect, the specific condition can become satisfied only when the travelling speed is smaller than the upper limit speed. Thus, even when the accelerator erroneous operations occur repeatedly, the drive force of the vehicle becomes the same as that of when the accelerator erroneous operation has occurred for the first time, if the travelling speed of the vehicle is greater than the upper limit speed. Therefore, even when the accelerator erroneous operations have occurred repeatedly, the first aspect can avoid an unnecessary increase in the travelling speed.

In another aspect (a second aspect) of the apparatus of the present disclosure, the control unit is configured to determine that the erroneous operation start condition becomes satisfied when at least a "first condition" becomes satisfied, the first condition being a condition satisfied when an increase amount (accelerator operation speed As) of the accelerator operation amount per unit time becomes greater than a predetermined operation speed threshold (Asth).

When the driver who is intending to rapidly decelerate the vehicle erroneously operates the accelerator pedal instead of the brake pedal (namely, that driver performs the accelerator erroneous operation performed), the increase amount of the accelerator operation amount per unit time (namely, accelerator operation speed) becomes a large value in many cases.

Therefore, according to the second aspect, it is possible to determine whether or not the accelerator erroneous operation has occurred (i.e., whether the erroneous operation start condition becomes satisfied) by executing a simple process on the basis of the accelerator operation speed.

In still another aspect (a third aspect) of the apparatus of the present disclosure, the control unit is configured to determine that the erroneous operation start condition becomes satisfied when at least a "second condition" becomes satisfied ("Yes" determination in step 530 of FIG. 5), the second condition being a condition satisfied when the accelerator operation amount becomes greater than a predetermined first operation amount threshold (Ath1) in a period from a time point at which an increase amount of the accelerator operation amount per unit time becomes greater than a predetermined operation speed threshold to a time point at which a predetermined first time threshold (Tth1) elapses from the time point at which the increase amount of the accelerator operation amount per unit time becomes greater than the predetermined operation speed threshold.

The second condition becomes satisfied when the accelerator operation amount reaches a great amount in a short time period after the accelerator operation speed has increased. Therefore, according to the third aspect, it is possible to accurately determine whether or not the accelerator erroneous operation has occurred.

In still another aspect (a fourth aspect) of the apparatus of the present disclosure, the control unit is configured to determine that the erroneous operation end condition becomes satisfied when at least a "third condition" becomes satisfied ("Yes" determination in step 565 of FIG. 5), the third condition being a condition satisfied when the accelerator operation amount becomes smaller than a predetermined second operation amount threshold (Ath2) which is smaller than the first operation amount threshold.

According to the fourth aspect, it is possible to determine whether or not the accelerator erroneous operation has been canceled (namely, the erroneous operation end condition becomes satisfied) by executing a simple process on the basis of the accelerator operation amount.

Notably, in the above description, in order to facilitate understanding of the present disclosure, the constituent elements of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

DETAILED DESCRIPTION

First Embodiment

Figure 1:
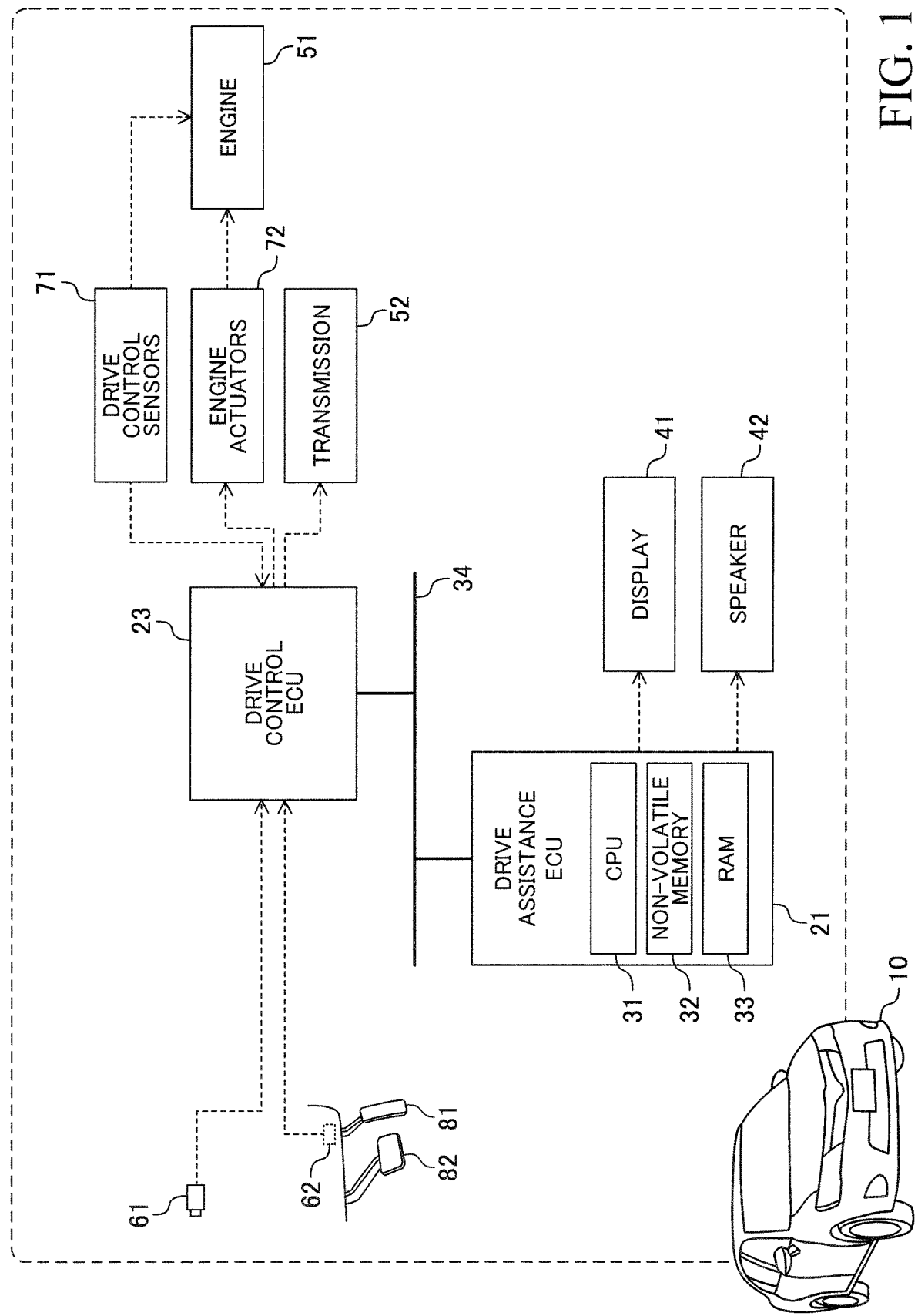
FIG. 1 is a block diagram of a driving assistance apparatus according to a first embodiment of the present disclosure (first assistance apparatus)

A driving assistance apparatus according to a first embodiment of the present disclosure (hereinafter also referred to as the "first assistance apparatus") will now be described with reference to the drawings. The first assistance apparatus is applied to a vehicle 10 whose block diagram is shown in FIG. 1. As understood from FIG. 1, the first assistance apparatus includes a drive assistance ECU 21 and a drive control ECU 23 each of which is an electronic control unit (ECU). Notably, the drive assistance ECU 21 and the brake control ECU 23 may be integrated into one ECU (namely, controller).

The drive assistance ECU 21 executes a "drive force suppressing processing" described later. The drive assistance ECU 21 includes a micro-computer, as a major component, which is equipped with a CPU 31, a non-volatile memory 32, and a RAM 33. The CPU 31 performs data reading, numerical computation, computation result output, and so on, by repeatedly executing predetermined programs (routines). The non-volatile memory 32 is formed by a ROM and a flash memory stores the programs executed by the CPU 31, lookup tables (maps) read by the CPU 31 during execution of the programs, and so on. The RAM 33 temporarily stores data read by the CPU The drive control ECU 23 includes a micro-computer as a major component similarly to the drive assistance ECU 21. The drive assistance ECU 21 and the drive control ECU 23 can perform data communication (can exchange data) with one another through a CAN (controller area network) 34. In addition, the drive assistance ECU 21 can receive detected values (specifically, a vehicle speed Vt and an accelerator operation amount Ap described later) of sensors that are connected to the drive control ECU 23 via the CAN 34.

The drive assistance ECU 21 is connected to a display 41 and a speaker 42. The display 41 is an LCD (liquid crystal display) placed at an appropriate position in the vehicle compartment so that the driver can view the display 41. Characters, figures, and the like to be displayed on the display 41 are controlled by the drive assistance ECU 21. The speaker 42 is disposed in the vehicle compartment of the vehicle 10. A warning sound, a voice message and the like to be played/generated by the speaker 42 are controlled by the drive assistance ECU 21.

The drive control ECU 23 controls a torque generated by an engine 51 and a gear ratio of a transmission 52, to thereby control a drive torque Dt which is a torque transmitted to drive wheels of the vehicle 10. The drive control ECU 23 is connected to a vehicle speed sensor 61, an accelerator operation amount sensor 62, drive control sensors 71, and engine actuators 72.

The vehicle speed sensor 61 detects the vehicle speed Vt which is a speed of the vehicle 10, and outputs a signal (hereinafter, also referred to as a "vehicle speed signal") indicative of the vehicle speed Vt to the drive control ECU 23. The vehicle speed signal is represented by a voltage which increases as the vehicle speed Vt increases. When the vehicle speed Vt is "0," the vehicle speed signal (namely, the voltage) is 0V.

The accelerator operation amount sensor 62 detects the accelerator operation amount Ap which is an operation amount (depression amount) of an accelerator pedal 81 operated by the driver for accelerating the vehicle 10, and outputs a signal (hereinafter, also referred to as an "accelerator signal") indicative of the accelerator operation amount Ap to the drive control ECU 23. When the operation to the accelerator pedal 81 is not performed, the accelerator operation amount Ap becomes "0," The accelerator operation amount Ap becomes larger as the operation amount of the accelerator pedal 81 becomes larger. The accelerator signal is represented by a voltage which increases as the accelerator operation amount Ap increases. When the accelerator operation amount Ap is "0," the accelerator signal (namely, the voltage) becomes 0V.

The drive control sensors 71 includes various sensors for detecting operation state quantities (parameters) of the engine 51 and driver's operation states relating to drive force control (except for the operation to the accelerator pedal 81) to output signals representing the detected values to the drive control ECU 23. Specifically, the drive control sensors 71 includes a throttle valve opening sensor, an engine rotational speed sensor, an intake air amount sensor, a shift position sensor which detects an operation status of a shift lever.

The engine actuators 72 includes a throttle valve actuator and fuel injectors. The drive control ECU 23 controls the engine actuators 72, to thereby control the torque generated by the engine 51.

The drive control ECU 23 executes a "target acceleration obtainment processing" so as to obtain (determine) a target acceleration Dtg every time a predetermined processing time Tp elapses. Furthermore, the drive control ECU 23 controls the drive torque Dt such that an acceleration Ac (namely, a change amount of the vehicle speed Vt per unit time) of the vehicle 10 coincides with the obtained target acceleration Dtg.

The target acceleration obtainment processing will be described. The drive control ECU 23 obtains a required acceleration Dre which is the acceleration Ac required by the driver, by applying the accelerator operation amount Ap and the vehicle speed Vt to a "relationship among the accelerator operation amount Ap, the vehicle speed Vt and the required acceleration Dre" represented by a graph shown in FIG. 2.

Figure 2:
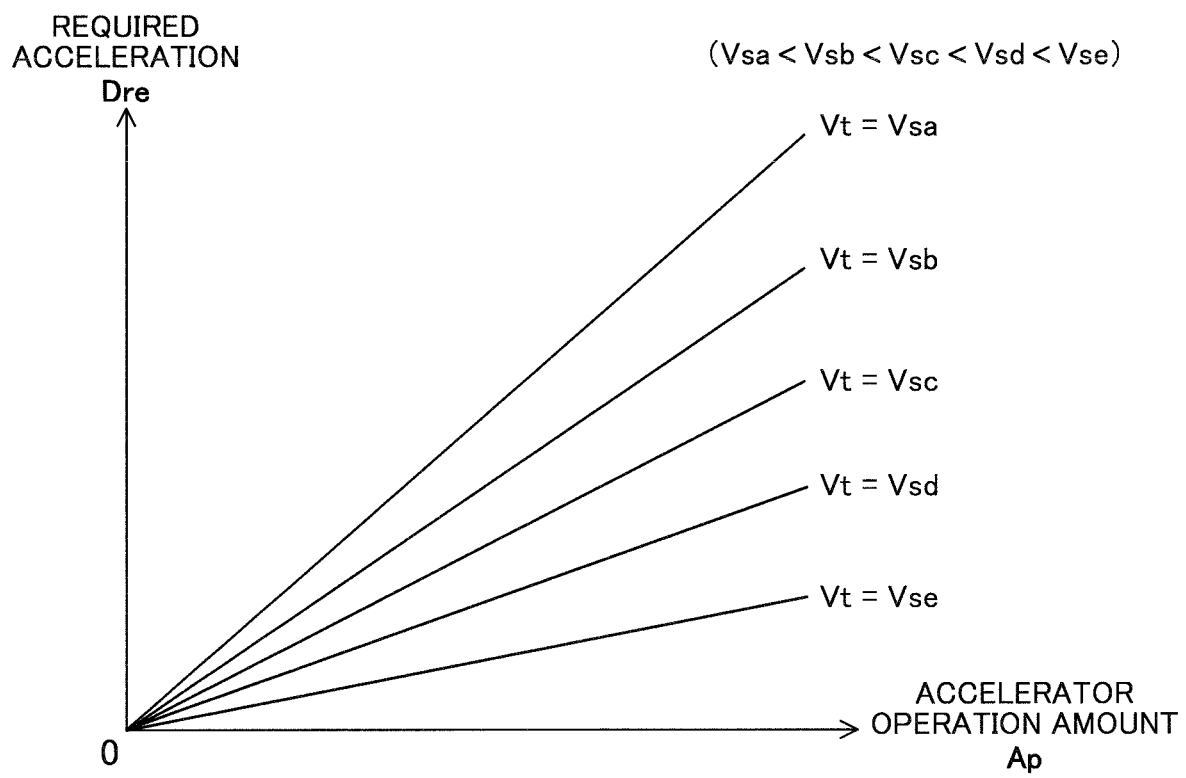
FIG. 2 is a graph showing a relationship among an accelerator operation amount, a vehicle speed, and a required acceleration.

In FIG. 2, a speed Vsa, a speed Vsb, a speed Vsc, a speed Vsd and a speed Vse are shown as examples of the vehicle speed Vt. The speed Vsa, the speed Vsb, the speed Vsc, the speed Vsd and the speed Vse increase (become larger) in this order (namely, Vsa<Vsb<Vsc<Vsd<Vse). As understood from FIG. 2, the required acceleration Dre increases as the accelerator operation amount Ap increases, and the required acceleration Dre increases as the vehicle speed Vt decreases.

The "relationship among the accelerator operation amount Ap, the vehicle speed Vt and the required acceleration Dre" represented by the graph shown in FIG. 2 has been stored in the non-volatile memory 32 in a form of a map (lookup table), and hereinafter, is also referred to as a "required acceleration map."

Subsequently, the drive control ECU 23 determines whether or not a "drive force control request" from the drive assistance ECU 21 has been received. Specifically, if the drive control ECU 23 has received the drive force control request including a limitation acceleration Ddc from the drive assistance ECU 21 via the CAN 34 in a period from a time point when the target acceleration obtainment processing was executed last time to the present (current) time point, the drive control ECU 23 determines that the drive force control request has been received.

If the drive force control request from the drive assistance ECU 21 has been received, the drive control ECU 23 sets the target acceleration Dtg to the "required acceleration Dre" or the "limitation acceleration Ddc included in the drive force control request", whichever is smaller. If the drive force control request from the drive assistance ECU 21 has not been received, the drive control ECU 23 sets the target acceleration Dtg to a value equal to the required acceleration Dre. The drive torque Dt which is controlled such that the acceleration Ac coincides with the required acceleration Dre is also referred to as an "ordinary drive force" for convenience' sake.

(Drive Force Suppressing Processing)

Next, the "drive force suppressing processing" executed by the drive assistance ECU 21 when the ECU 21 determines that the driver is erroneously operating the accelerator pedal 81 (namely, the accelerator erroneous operation has occurred) will be described. In many cases, the accelerator erroneous operations occur when the driver erroneously/mistakenly operates the accelerator pedal 81 instead of a "brake pedal 82 that is adjacent and close to the accelerator pedal 81 (see FIG. 1)."

The drive force suppressing processing includes a "first suppressing processing" and a "second suppressing processing." Specifically, the drive assistance ECU 21 executes either one of the first suppressing processing and the second suppressing processing, as the drive force suppressing processing is being executed. The second suppressing processing is a processing executed when it is determined that the accelerator erroneous operations have occurred repeatedly.

First, a method by which the drive assistance ECU 21 determines whether or not the accelerator erroneous operation has occurred will be described. The drive assistance ECU 21 determines that the accelerator erroneous operation has occurred when an "erroneous operation start condition" described later becomes satisfied. In addition, the drive assistance ECU 21 determines that the accelerator erroneous operation has just been canceled (resolved or ended) when an "erroneous operation end condition" described later becomes satisfied.

A period from a time point when the erroneous operation start condition becomes satisfied to a time point when the erroneous operation end condition becomes satisfied is also referred to as an "erroneous operation period" for convenience' sake. Meanwhile, a period different from (other than) the erroneous operation period is also referred to as an "ordinary period" for convenience' sake.

The erroneous operation start condition is a condition that becomes satisfied when the accelerator operation amount Ap becomes greater than a predetermined first operation amount threshold Ath1 in a period (referred to as a "first monitoring period") from a time point (referred to as a "first timing") at which an accelerator operation speed As becomes greater than a predetermined operation speed threshold Asth to a time point (referred to as a "second timing") at which a predetermined first time threshold Tth1 elapses from the first timing. The accelerator operation speed As is an increase amount of the accelerator operation amount Ap per unit time.

A condition that becomes satisfied when the accelerator operation speed As becomes greater than the operation speed threshold Asth is also referred to as a "first condition" for convenience' sake. Thus, the first timing is a time point at which the first condition becomes satisfied. A condition that becomes satisfied when the accelerator operation amount Ap becomes greater than the first operation amount threshold Ath1 in the first monitoring period is also referred to as a "second condition" for convenience' sake. Namely, in the present embodiment, the erroneous operation start condition is the same as the second condition.

The erroneous operation end condition is a condition that becomes satisfied when the accelerator operation amount Ap becomes smaller than a predetermined second operation amount threshold Ath2 which is smaller than the first operation amount threshold Ath1 (namely, 0<Ath2<Ath1). A condition that becomes satisfied when the accelerator operation amount Ap becomes smaller than the second operation amount threshold Ath2 is also referred to as a "third condition" for convenience' sake. Namely, in the present embodiment, the erroneous operation end condition is the same as the third condition.

Furthermore, if a "repeated erroneous operation condition" is also satisfied when the erroneous operation start condition becomes satisfied, the drive assistance ECU 21 determines that the accelerator erroneous operations have occurred repeatedly (or have repeated). The repeated erroneous operation condition is a condition that becomes satisfied when the erroneous operation start condition becomes satisfied in a period (referred to as a "second monitoring period") from a time point (referred to as a "third timing") at which the erroneous operation end condition becomes satisfied to a time point (referred to as a "fourth timing") at which a predetermined second time threshold Tth2 elapses from the third timing. The time point (i.e., the fourth timing) at which the second time threshold Tth2 elapses from the time point (i.e., the third timing) at which the erroneous operation end condition was satisfied is also referred to as a "reoperation determination time point" for convenience' sake.

If the repeated erroneous operation condition is not satisfied when the erroneous operation start condition becomes satisfied, the drive assistance ECU 21 executes the first suppressing processing as the drive force suppressing processing. Whereas, when both the repeated erroneous operation condition and the erroneous operation start condition are satisfied, the drive assistance ECU 21 executes the second suppressing processing as the drive force suppressing processing.

The first suppressing processing is a processing in which the target acceleration Dtg is set to "0." Accordingly, when the first suppressing processing is being executed, the drive torque Dt is "0," and thus, the vehicle speed Vt decreases. Specifically, the drive assistance ECU 21 sends the drive force control request including the limitation acceleration Ddc which is set to "0" to the drive control ECU 23 every time the processing time Tp elapses when the first suppressing processing is being executed. The drive control ECU 23, which receives that drive force control request, sets the target acceleration Dtg to "0." The drive torque Dt which is set to "0" when the first suppressing processing is being executed is also referred to as a "first drive force" for convenience' sake.

The second suppressing processing is a processing in which the target acceleration Dtg is set to a value equal to or smaller than the required acceleration Dre, and, in many cases, the target acceleration Dtg is set to a value smaller than the required acceleration Dre. More specifically, the drive assistance ECU 21 obtains the limitation acceleration Ddc by applying the vehicle speed Vt to a relationship between the vehicle speed Vt and the limitation acceleration Ddc represented by a polygonal line Lf shown in FIG. 3 when the second suppressing processing is being executed.

In addition, the drive assistance ECU 21 sends the drive force control request including that obtained limitation acceleration Ddc to the drive control ECU 23 every time the processing time Tp elapses.

Figure 3:
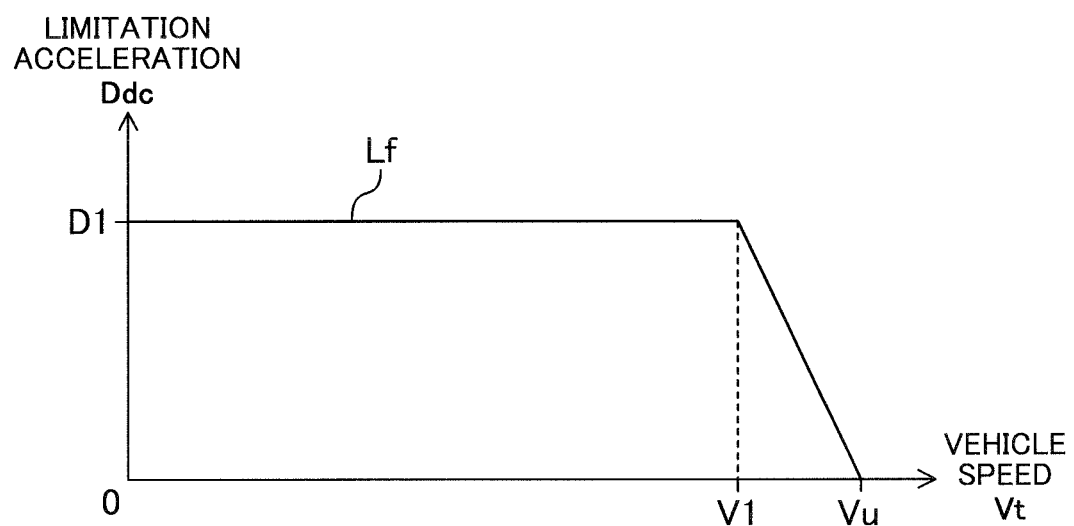
FIG. 3 is a graph showing a relationship between the vehicle speed and a limitation (restricting) acceleration.

As understood from FIG. 3, when the vehicle speed Vt is smaller than a first speed V1, the limitation acceleration Ddc is a first acceleration D1. When the vehicle speed Vt is within a range from the first speed V1 to an upper limit speed Vu (that is larger than the first speed V1), the limitation acceleration Ddc decreases in a range from the first acceleration D1 to "0" as the vehicle speed Vt increases. When the vehicle speed Vt is greater than the upper limit speed Vu, the limitation acceleration Ddc is "0." In the present embodiment, the upper limit speed Vu is 30 km/h.

A condition that is satisfied when the second suppressing processing is being executed and the vehicle speed Vt is smaller than the upper limit speed Vu is also referred to as a "specific condition" for convenience' sake. In other words, the specific condition is satisfied in a case where the present time point is included in a period from a time point at which both the repeated erroneous operation condition and the erroneous operation start condition has become satisfied to a time point at which the erroneous operation end condition is satisfied, and the vehicle speed Vt is smaller than the upper limit speed Vu.

The "relationship between the vehicle speed Vt and the limitation acceleration Ddc" represented by the line Lf shown in FIG. 3 is stored in the non-volatile memory 32 in a form of a map (lookup table), and hereinafter, is also referred to as a "limitation acceleration map." The limitation acceleration map of FIG. 3 is configured (arranged) in advance such that "the limitation acceleration Ddc obtained on the basis of that limitation acceleration map" is smaller than "the required acceleration Dre obtained on the basis of the required acceleration map of FIG. 2" in many cases (depending on the vehicle speed Vt and the accelerator operation amount Ap).

The drive torque Dt controlled on the basis of "the limitation acceleration Ddc set to a value smaller than the required acceleration Dre" when the second suppressing processing is being executed is also referred to as a "second drive force" for convenience' sake. The first drive force and the second drive force are collectively referred to as an "erroneous operation coping drive force" for convenience' sake.

When the drive assistance ECU 21 is executing the drive force suppressing processing, the ECU 21 executes a "notification processing" for notifying the driver that the drive force suppressing processing is being executed through characters displayed on the display 41 and a warning sound generated by the speaker 42.

Figure 4:
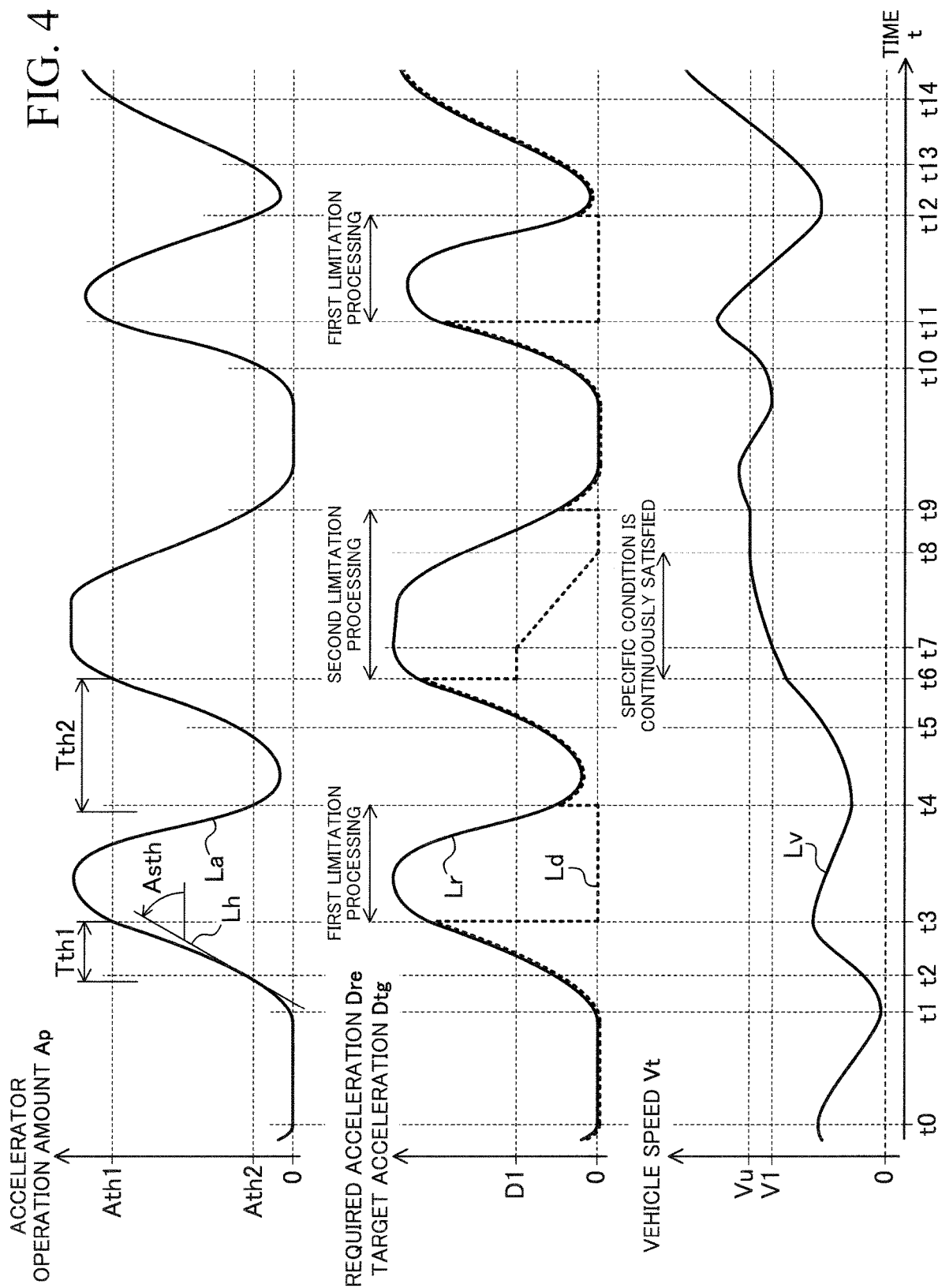
FIG. 4 is a timing chart showing changes in the accelerator operation amount, the required acceleration, a target acceleration and the vehicle speed.

The drive force suppressing processing will next be described more specifically with reference to a timing chart shown in FIG. 4. In FIG. 4, the leftmost end of the timing chart represents a time point t0. Time elapses as following to the right of the timing chart and time t becomes a time point t14 via a time point t1 to t13. The drive force suppressing processing has not been executed in a period from a time point when an ignition-ON operation of the vehicle 10 is performed by the driver to the time point t0. In addition, the vehicle 10 does not generate a brake force in a period from the time point t0 to the time point t14. Namely, a frictional brake apparatus provided in the vehicle 10 does not operate in the period shown in FIG. 4.

A curved line La shown in FIG. 4 indicates the accelerator operation amount Ap. A curved line Lr indicates the required acceleration Dre. A dashed line Ld indicates the target acceleration Dtg. A curved line Lv indicates the vehicle speed Vt.

In this example shown in FIG. 4, when the drive force suppressing processing is not being executed (namely, neither the first suppressing processing nor the second suppressing processing is being executed), the required acceleration Dre (refer to the curved line Lr) and the target acceleration Dtg (refer to the dashed line Ld) coincide with each other (for example, see, a period from the time point t0 to the time point t3, a period from the time point t4 to the time point t6, and a period from the time point t9 to the time point t11). Whereas, when the drive force suppressing processing is being executed, the target acceleration Dtg (refer to the dashed line Ld) is smaller than the required acceleration Dre (refer to the curved line Lr) since the target acceleration Dtg cannot exceed (is limited by) the limitation acceleration Ddc (for example, see, a period from the time point t3 to the time point t4, a period from the time point t6 to the time point t9, and a period from the time point t11 to the time point t12).

As understood from the curved line La, at the time point t0, the driver ends the accelerator operation, and thus, the accelerator operation amount Ap becomes "0." As a result, the required acceleration Dre becomes "0" as understood from the curved line Lr, and thus, the target acceleration Dtg becomes "0" as understood from the dashed line Ld. Accordingly, the drive torque Dt becomes "0," and thus, the vehicle speed Vt decreases after the time point t0 (until the time point t1 as described later) by a so-called engine brake as understood from the curved line Lv.

At the time point t1, the driver starts the operation to the accelerator pedal 81 (namely, the accelerator operation), and the accelerator operation amount Ap starts increasing from "0." As a result, the required acceleration Dre (that is, at this time point, equal to the target acceleration Dtg) starts increasing from "0," and thus, the vehicle speed Vt starts increasing.

At the time point t2, the accelerator operation speed As becomes greater than the operation speed threshold Asth. Notably, the operation speed threshold Asth is indicated by a gradient (inclination) of an auxiliary line Lh in FIG. 4. Subsequently, at the time point t3, the accelerator operation amount Ap becomes greater than the first operation amount threshold Ath1. A period from the time point t2 to the time point t3 is shorter than the first time threshold Tth1 (i.e., t3−t2<Tth1). Therefore, at the time point t3, the erroneous operation start condition becomes satisfied.

At the time point t3, the repeated erroneous operation condition does not become satisfied since the drive force suppressing processing has not been executed in a period from the time point when the ignition-ON operation was performed to the time point t0 as described above. Accordingly, the drive assistance ECU 21 starts executing the first suppressing processing at the time point t3. As a result, the target acceleration Dtg is kept at "0" after the time point t3 (until the time point t4 as described later), and thus, the vehicle speed Vt decreases.

At the time point t4, the accelerator operation amount Ap becomes smaller than the second operation amount threshold Ath2. Therefore, the erroneous operation end condition becomes satisfied at the time point t4. Accordingly, the drive assistance ECU 21 stops executing the first suppressing processing at the time point t4. Consequently, the target acceleration Dtg is made equal to (coincides with) the required acceleration Dre (in other words, the target acceleration Dtg is kept greater than "0") after the time point t4 (until the time point t6 as described later), and thus, the vehicle speed Vt increases.

At the time point t5, the accelerator operation speed As becomes greater than the operation speed threshold Asth. Subsequently, at the time point t6, the accelerator operation amount Ap becomes greater than the first operation amount threshold Ath1. A period from the time point t5 to the time point t6 is shorter than the first time threshold Tth1 (i.e., t6−t5<Tth1). Therefore, at the time point t6, the erroneous operation start condition is satisfied.

In addition, a period from the time point t4 (at which the erroneous operation end condition became satisfied) to the time point t6 (at which the erroneous operation start condition becomes satisfied) is shorter than the second time threshold Tth2 (i.e., t6−t4<Tth2). Thus, at the time point t6, the repeated erroneous operation condition becomes satisfied. Accordingly, the drive assistance ECU 21 starts executing the second suppressing processing at the time point t6.

The vehicle speed Vt at the time point t6 is smaller than the first speed V1, and thus, the limitation acceleration Ddc (and the target acceleration Dtg which is set to a value equal to the limitation acceleration Ddc) is set to the first acceleration D1. At the time point t7, the vehicle speed Vt becomes equal to the first speed V1, and thus, the limitation acceleration Ddc decreases as the vehicle speed Vt increases after the time point t7 (until the time point t8 as described later).

At the time point t8, the vehicle speed Vt becomes equal to the upper limit speed Vu, and thus, the limitation acceleration Ddc at the time point t8 becomes equal to "0." Thus, the drive torque Dt becomes equal to "0" at the time point t8. As a result, when the vehicle speed Vt becomes smaller than the upper limit speed Vu, the limitation acceleration Ddc becomes greater than "0" and the vehicle speed Vt increases. As understood from the above, when and after the vehicle speed Vt becomes equal to the upper limit speed Vu while the second suppressing processing is being executed, a processing in which the limitation acceleration Ddc is set to "0" and a processing in which the limitation acceleration Ddc is set to a value greater than "0" are executed alternately. Consequently, the vehicle speed Vt is kept close to the upper limit speed Vu until the second suppressing processing ends.

At the time point t9, the accelerator operation amount Ap becomes smaller than the second operation amount threshold Ath2. Therefore, the erroneous operation end condition becomes satisfied at the time point t9. Accordingly, the drive assistance ECU 21 stops executing the second suppressing processing at the time point t9.

Notably, the specific condition described above (i.e., the condition which is satisfied when the second suppressing processing is being executed and the vehicle speed Vt is smaller than the upper limit speed Vu) is continuously satisfied during a period from the time point t6 to the time point t8. In addition, in a period from the time point t8 to the time point t9, the vehicle speed Vt becomes smaller than the upper limit speed Vu intermittently, and thus, the specific condition is satisfied when in that period in which the vehicle speed Vt is smaller than the upper limit speed Vu temporarily.

At the time point t10, the accelerator operation speed As becomes greater than the operation speed threshold Asth. Subsequently, at the time point t11, the accelerator operation amount Ap becomes greater than the first operation amount threshold Ath1. A period from the time point t10 to the time point t11 is shorter than the first time threshold Tth1 (i.e., t11−t10<Tth1). Therefore, at the time point t11, the erroneous operation start condition is satisfied.

Meanwhile, a period from the time point t9 (at which the erroneous operation end condition became satisfied) to the time point t11 (at which the erroneous operation start condition becomes satisfied) is longer than the second time threshold Tth2 (i.e., t11−t9<Tth2). Thus, at the time point t11, the repeated erroneous operation condition does not become satisfied. Accordingly, the drive assistance ECU 21 starts executing the first suppressing processing at the time point t11. As a result, the target acceleration Dtg is set to "0" after the time point t11 (until the time point t12 as described later), and thus, the vehicle speed Vt starts decreasing.

At the time point t12, the accelerator operation amount Ap becomes smaller than the second operation amount threshold Ath2. Thus, the erroneous operation end condition becomes satisfied at the time point t12. Accordingly, the drive assistance ECU 21 stops executing the first suppressing processing at the time point t12. Therefore, the target acceleration Dtg coincides with the required acceleration Dre after the time point t12, and thus, the vehicle speed Vt increases.

At the time point t13, the accelerator operation speed As becomes greater than the operation speed threshold Asth. Subsequently, at the time point t14, the accelerator operation amount Ap becomes greater than the first operation amount threshold Ath1. However, a period from the time point t13 to the time point t14 is longer than the first time threshold Tth1 (namely, t14−t13>Tth1). Thus, at the time point t14, the erroneous operation start condition does not become satisfied. Therefore, in this case, the drive force suppressing processing is not executed.

(Specific Operation)

Next, specific operation of the drive assistance ECU 21 will be described with reference to FIGS. 5 and 6. The CPU 31 (hereinafter also referred to as "the CPU" for simplification) of the drive assistance ECU 21 executes an "erroneous operation determination processing routine" represented by a flowchart shown in FIG. 5 every time the processing time Tp elapses. Furthermore, when the CPU completes the execution of the erroneous operation determination processing routine of FIG. 5, the CPU starts to execute a "drive force suppressing processing routine" represented by a flowchart shown in FIG. 6.

In these routines, the CPU refers to and changes values of an erroneous operation flag Xmp, an operation speed condition flag Xos, and a repeated erroneous operation flag Xre. The CPU sets each of these flags to "0" in an initialization routine (not shown) which the CPU executes when the drive assistance ECU 21 is booted (turned on) (namely, when the ignition-ON operation of the vehicle 10 is performed by the driver).

The value of the erroneous operation flag Xmp is set to "1," when it is determined that the accelerator erroneous operation has been occurring. The value of the operation speed condition flag Xos is set to "1," when the accelerator operation speed As becomes greater than the operation speed threshold Asth. The value of the repeated erroneous operation flag Xre is set to "1," when it is determined that the accelerator erroneous operations occur repeatedly.

(Case A)

First, the erroneous operation determination processing routine shown in FIG. 5 will be described. It is now assumed that the operation to the accelerator pedal 81 (i.e., accelerator operation) is not being performed, and thus, the accelerator erroneous operation does not occur (see the period from the time point t0 to the time point t1 in FIG. 4).

Figure 5:
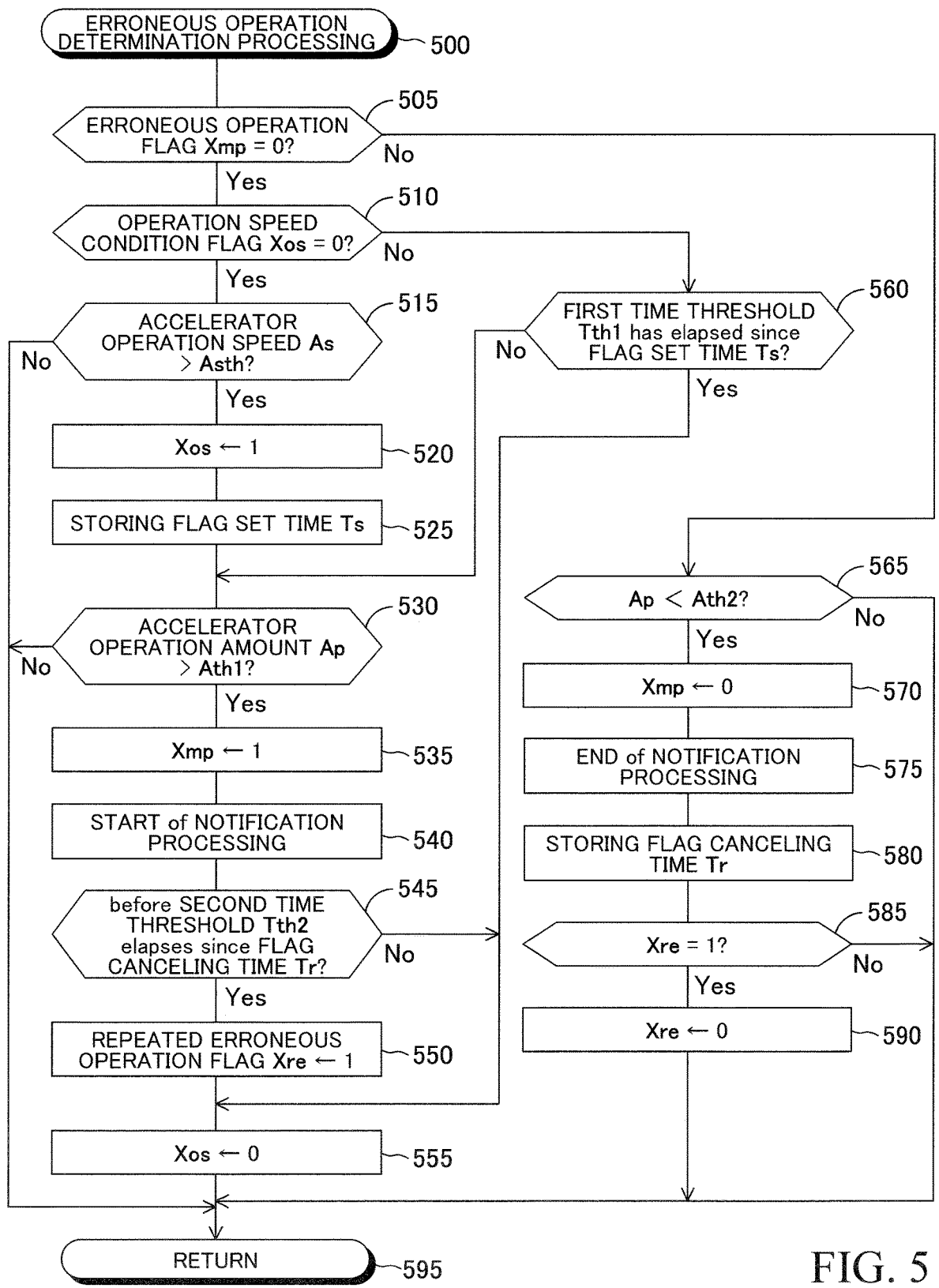
FIG. 5 is a flowchart representing an erroneous operation determination processing routine executed by the first assistance apparatus.

When an execution timing of the erroneous operation determination processing routine has come, the CPU starts the process of step 500 of FIG. 5 and proceeds to step 505 so as to determine whether or not the value of the erroneous operation flag Xmp is "0."

According to the assumption described above, the accelerator erroneous operation does not occur, and thus, the value of the erroneous operation flag Xmp is kept at "0." Accordingly, the CPU makes a "Yes" determination in step 505 and proceeds to step 510 so as to determine whether or not the value of the operation speed condition flag Xos is "0."

According to the assumption described above, the operation to the accelerator pedal 81 is not being performed, and thus, the value of the operation speed condition flag Xos is kept at "0." Accordingly, the CPU makes a "Yes" determination in step 510 and proceeds to step 515 so as to determine whether or not the accelerator operation speed As is greater than the operation speed threshold Asth.

More specifically, the CPU obtains (figures out) by dividing a difference (=ApPresent−ApOld) between "the accelerator operation amount Ap (=ApPresent) at the present time" and "the accelerator operation amount Ap (=ApOld) when the present routine was executed last time" by the processing time Tp. In addition, the CPU determines whether or not that obtained accelerator operation speed As is greater than the operation speed threshold Asth.

According to the assumption described above, the accelerator operation is not performed, and thus, the accelerator operation speed As is "0." Accordingly, the CPU makes a "No" determination in step 515 and proceeds to step 595 directly so as to end the present routine.

(Case B)

It is assumed that the present routine is being executed for the first time after the accelerator operation speed As became greater than the operation speed threshold Asth while the accelerator operation amount Ap was smaller than the first operation amount threshold Ath1. In addition, it is also assumed that the accelerator operation speed As has become greater than the operation speed threshold Asth for the first time after the ignition-ON operation of the vehicle 10 was performed (see the time point t2 in FIG. 4).

In this case, the CPU makes a "Yes" determination in step 515 following step 505 and 510, and proceeds to step 520 so as to set the value of the operation speed condition flag Xos to "1." Subsequently, the CPU proceeds to step 525 so as to store the present time point as a flag set time Ts in the RAM 33. Furthermore, the CPU proceeds to step 530 so as to determine whether or not the accelerator operation amount Ap is greater than the first operation amount threshold Ath1.

According to the assumption described above, the accelerator operation speed As is smaller than the first operation amount threshold Ath1, and thus, the CPU makes a "No" determination in step 530 and proceeds to step 595 directly.

(Case C)

It is assumed that thereafter the present routine is being executed for the first time after the accelerator operation amount Ap became greater than the first operation amount threshold Ath1 within a period from the flag set time Ts to a time point at which an elapsed time form the flag set time Ts reaches the first time threshold Tth1 (see the time point t3 in FIG. 4).

In this case, the value of the operation speed condition flag Xos has been set to "1," and thus, the CPU makes a "No" determination in step 510 and proceeds to step 560 so as to determine whether or not the first time threshold Tth1 has elapsed since the flag set time Ts. Namely, the CPU determines whether or not a length of a period from the flag set time Ts stored in the RAM 33 to the present time point is longer than the first time threshold Tth1.

According to the assumption described above, the first time threshold Tth1 has not elapsed from the flag set time Ts, and thus, the CPU makes a "No" determination in step 560 and proceeds to step 530. According to the assumption described above, the accelerator operation amount Ap is greater than the first operation amount threshold Ath1, and thus, the CPU makes a "Yes" determination in step 530 and proceeds to step 535 so as to set the value of the erroneous operation flag Xmp to "1."

Subsequently, the CPU proceeds to step 540 so as to control the display 41 and the speaker 42, to thereby start executing the notification processing. Furthermore, the CPU proceeds to step 545 so as to determine whether or not the present time point is a time point before the second time threshold Tth2 elapses since a flag canceling time Tr described later.

Namely, at step 545, the CPU determines whether or not the present time point is a time point at which a length of a period from the flag canceling time Tr stored in the RAM 33 is shorter than the second time threshold Tth2. Notably, when the CPU proceeds to step 545, the CPU makes a "No" determination in step 545 if the flag canceling time Tr is not stored in the RAM 33.

As described later in detail, the flag canceling time Tr is a time point at which the erroneous operation end condition becomes satisfied and which is stored in the RAM 33. According to the assumption described above, the erroneous operation start condition has not become satisfied after the ignition-ON operation of the vehicle 10 was performed, and thus, the erroneous operation end condition does not become satisfied.

Figure 6:
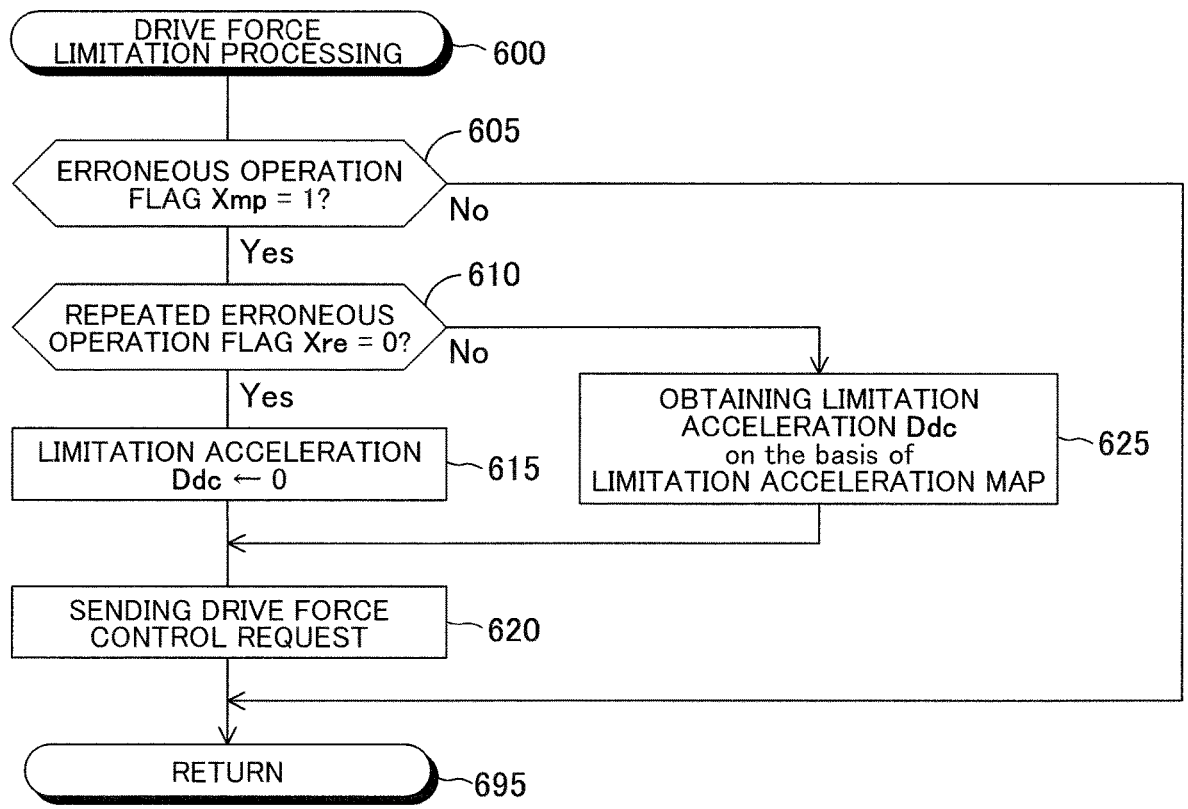
FIG. 6 is a flowchart representing a drive force suppressing processing routine executed by the first assistance apparatus.

Accordingly, the flag canceling time Tr is not stored in the RAM 33, and thus, the CPU makes a "No" determination in step 545 and directly proceeds to step 555 so as to set the value of the operation speed condition flag Xos to "0." At this time point, the value of the erroneous operation flag Xmp has been set at "1" and the value of the repeated erroneous operation flag Xre has been set at "0," and thus, the first suppressing processing is executed in the drive force suppressing processing routine of FIG. 6 as described later.

When the present routine (namely, the erroneous operation determination processing routine of FIG. 5) is executed next time, since the value of the erroneous operation flag Xmp is "1," the CPU makes a "No" determination in step 505 and proceeds to step 565 so as to determine whether or not the accelerator operation amount Ap is smaller than the second operation amount threshold Ath2. In other words, at step 565, the CPU determines whether or not the erroneous operation end condition is satisfied.

In this case, it is immediately after the erroneous operation start condition was satisfied, and thus, the accelerator operation amount Ap is greater than the second operation amount threshold Ath2. Accordingly, the CPU makes a "No" determination in step 565 and proceeds to step 595 directly.

(Case D)

It is assumed that thereafter the present routine is being executed for the first time after the accelerator operation amount Ap becomes smaller than the second operation amount threshold Ath2 (see the time point t4 in FIG. 4).

In this case, the CPU makes a "Yes" determination in step 565 and proceeds to step 570 so as to set the value of the erroneous operation flag Xmp to "0." Subsequently, the CPU proceeds to step 575 so as to stop executing the notification processing using the display 41 and the speaker 42.

Furthermore, the CPU proceeds to step 580 so as to store the present time point as the flag canceling time Tr in the RAM 33. Subsequently, the CPU proceeds to step 585 so as to determine whether or not the value of the repeated erroneous operation flag Xre is "1."

According to the assumption described above, the value of the repeated erroneous operation flag Xre is "0," and thus, the CPU makes a "No" determination in step 585 and proceeds to step 595 directly. As a result, the value of the erroneous operation flag Xmp is set to "0" while the value of the repeated erroneous operation flag Xre is kept at "0," and thus, the execution of the drive force suppressing processing in the drive force suppressing processing routine of FIG. 6 ends.

(Case E)

It is assumed that thereafter the present routine is being executed for the first time after the erroneous operation start condition became satisfied within a period from the flag canceling time Tr to a time point at which an elapsed time form the flag canceling time Tr reaches the second time threshold Tth2 (see the time point t6 in FIG. 4).

In this case, the CPU makes a "Yes" determination in step 545 and proceeds to step 550 so as to set the value of the repeated erroneous operation flag Xre to "1." Subsequently, the CPU proceeds to step 555. As a result, the value of the erroneous operation flag Xmp has been set to "1" in step 535 and the value of the repeated erroneous operation flag Xre has been set to "1" in step 550, and thus, the second suppressing processing is executed in the drive force suppressing processing routine of FIG. 6.

(Other Cases)

Next, it is assumed that the accelerator operation amount Ap does become greater than Ath1 in the period from a time point at which the accelerator operation speed As became greater than the operation speed threshold Asth to a time point at which the first time threshold Tth1 elapses since the time point at which the accelerator operation speed As became greater than the operation speed threshold Asth (see a time point after the elapse of the first time threshold Tth1 from the time point t13 in FIG. 4). In this case, the CPU makes a "Yes" determination in step 560 and proceeds to step 555. As a result, the value of the erroneous operation flag Xmp is kept at "0," and thus, the drive force suppressing processing is not executed.

Furthermore, when the erroneous operation end condition becomes satisfied while the value of the repeated erroneous operation flag Xre is "1" (see the time point t9 in FIG. 4), the value of the erroneous operation flag Xmp has been set to "1" (see step 535 and 550). In this case, the CPU executes processes of step 565 to 580 and proceeds to step 585. In step 585, the CPU makes a "Yes" determination and proceeds to step 590 so as to set the value of the repeated erroneous operation flag Xre to "0." Subsequently, the CPU proceeds to step 595.

Next, the drive force suppressing processing routine will be described. When the execution of the erroneous operation determination processing routine of FIG. 5 is completed, the CPU starts the process of step 600 of FIG. 6 and proceeds to step 605 so as to determine whether or not the value of the erroneous operation flag Xmp is "1."

If the value of the erroneous operation flag Xmp is "1," the CPU makes a "Yes" determination in step 605 and proceeds to step 610 so as to determine whether or not the value of the repeated erroneous operation flag Xre is "0."

If the value of the repeated erroneous operation flag Xre is "0," the CPU makes a "Yes" determination in step 610 and proceeds to step 615 so as to set the value of the limitation acceleration Ddc to "0." Subsequently, the CPU proceeds to step 620 so as to send the drive force control request including the limitation acceleration Ddc to the drive control ECU 23 via the CAN 34.

Furthermore, the CPU proceeds to step 695 so as to end the present routine. Accordingly, in this case (namely, in a case where the value of the erroneous operation flag Xmp is "1" and the value of the repeated erroneous operation flag Xre is "0"), the first suppressing processing is executed.

Meanwhile, if the value of the repeated erroneous operation flag Xre is "1," the CPU makes a "No" determination in step 610 and proceeds to step 625 so as to obtain the limitation acceleration Ddc on the basis of the limitation acceleration map of FIG. 3. Subsequently, the CPU proceeds to step 620. Accordingly, in this case (namely, the values of the erroneous operation flag Xmp and the repeated erroneous operation flag Xre are "1" respectively), the second suppressing processing is executed.

Whereas, if the value of the erroneous operation flag Xmp is "0," the CPU makes a "No" determination in step 605 and proceeds to step 695 directly. Accordingly, in this case, the drive force control request is not sent to the drive control ECU 23 (namely, the drive force suppressing processing is not executed).

Second Embodiment

Next, a driving assistance apparatus according to a second embodiment of the present disclosure (hereinafter also referred to as the "second assistance apparatus") will be described. The first assistance apparatus reduces the drive torque Dt by means of sending the drive force control request including the limitation acceleration Ddc to the drive control ECU 23, when the drive force suppressing processing is being executed. In contrast, the second assistance apparatus reduces the drive torque Dt by means of changing (correcting) the accelerator signal received by the drive control ECU 23, when the drive force suppressing processing is being executed. This difference will be described below.

Figure 7:
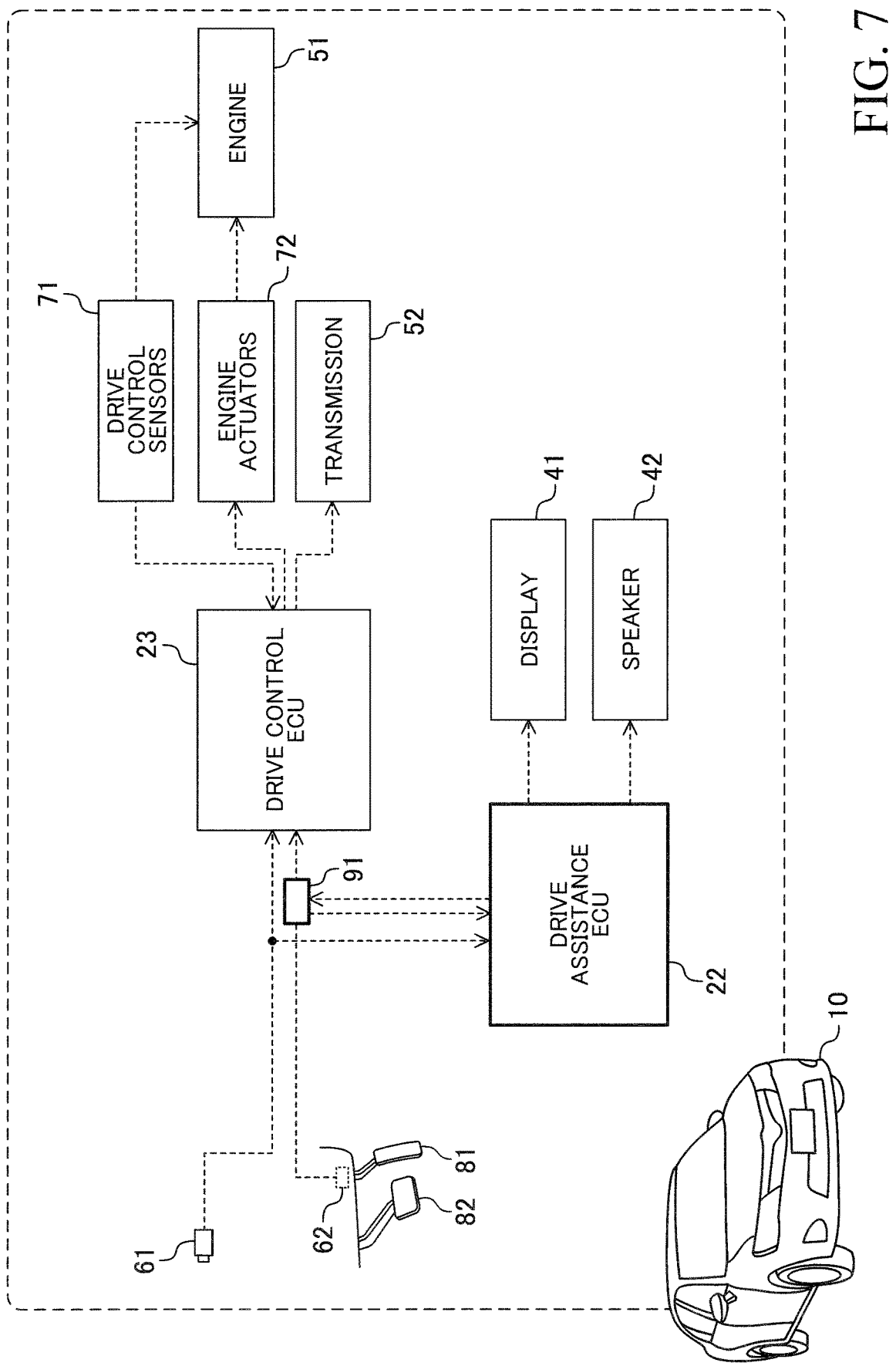
FIG. 7 is a block diagram of a driving assistance apparatus according to a second embodiment of the present disclosure.

A block diagram of the second assistance apparatus is shown in FIG. 7. As understood from FIG. 7, the second assistance apparatus includes a drive assistance ECU 22. The drive assistance ECU 22 includes a micro-computer as a major component similarly to the drive assistance ECU 21. The vehicle speed signal output by the vehicle speed sensor 61 is received by the drive assistance ECU 22 and the drive control ECU 23 respectively. The accelerator signal output by the accelerator operation amount sensor 62 is received by the drive assistance ECU 22 and the drive control ECU 23 respectively via a signal control apparatus 91.

The drive control ECU 23 according to the second embodiment does not receive the drive force control request including the limitation acceleration Ddc from the drive assistance ECU 21. Accordingly, the drive control ECU 23 set the target acceleration Dtg to a value equal to the required acceleration Dre regardless of whether or not the drive force suppressing processing is being executed.

The drive assistance ECU 22 can switch the signal control apparatus 91 between an ON state and an OFF state. When the signal control apparatus 91 is in the ON state, the drive control ECU 23 can receive the accelerator signal. Namely, in this case, the drive control ECU 23 can obtain the accelerator operation amount Ap.

Meanwhile, when the signal control apparatus 91 is in the OFF state, the signal control apparatus 91 interrupts (blocks off) the accelerator signal to the drive control ECU 23 (so as to output 0V as the accelerator signal). Namely, when the signal control apparatus 91 is in the OFF state, the accelerator signal which the drive control ECU 23 receives is 0V. Therefore, in this case, the drive control ECU 23 determines that the accelerator operation amount Ap is "0."

When the drive force suppressing processing is being executed, the drive assistance ECU 22 obtains (determines) a duty ratio Rd which is a ratio of an "ON time length" to a "unit time length." The ON time length corresponds to a length of time when the signal control apparatus 91 is in the ON state. The unit time length is a length of a predetermined unit time which is longer than the processing time Tp. In addition, the drive assistance ECU 22 controls the signal control apparatus 91 such that an actual value of the duty ratio Rd coincides with that obtained duty ratio Rd.

When the duty ratio Rd is "0," the drive control ECU 23 determines that the accelerator operation amount Ap is "0," and thus, the required acceleration Dre obtained on the basis of the required acceleration map of FIG. 2 is "0." Accordingly, in this case, the drive torque Dt is "0."

When the duty ratio Rd is "1," the drive torque Dt is controlled such that an actual value of the acceleration Ac coincides with the required acceleration Dre obtained on the basis of the actual accelerator operation amount Ap and the required acceleration map of FIG. 2 (namely, the target acceleration Dtg). The drive torque Dt becomes larger (so as to be closer to the required acceleration Dre obtained on the basis of the actual accelerator operation amount Ap and the required acceleration map of FIG. 2) as the duty ratio Rd becomes larger in a range from "0" to "1."

When the first drive force suppressing processing is being executed (namely, the process of step 615 of FIG. 6 is executed), the drive assistance ECU 22 sets the duty ratio Rd to "0." In addition, the drive assistance ECU 22 controls the signal control apparatus 91 on the basis of that duty ratio Rd in step 620 of FIG. 6. In this case, the drive control ECU 23 determines that a state in which the accelerator operation amount Ap is "0" continues (is lasting), so that the drive torque Dt is set to "0."

Figure 8:
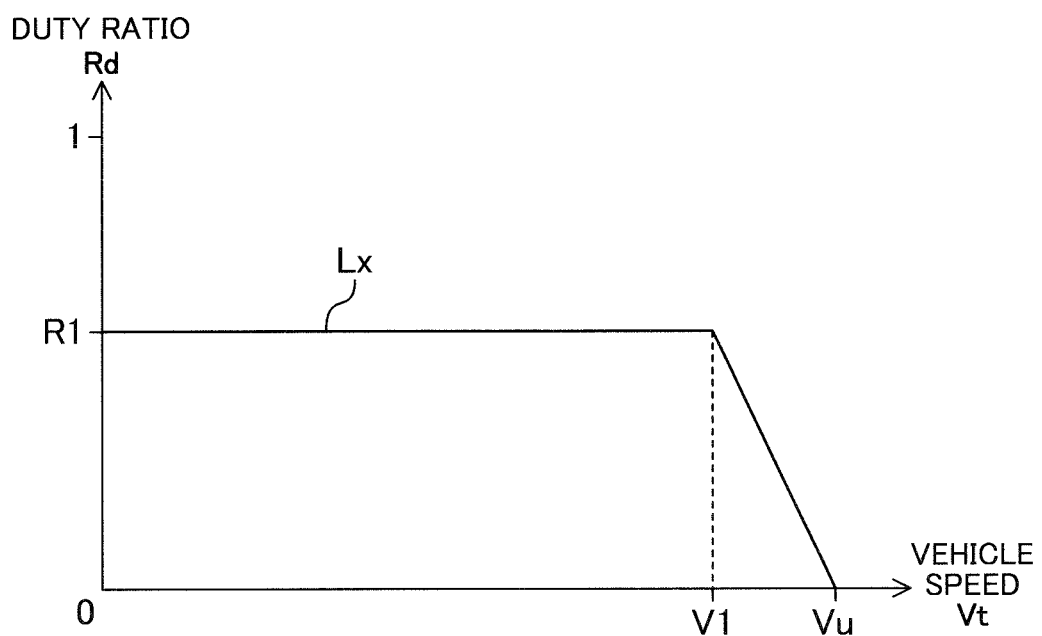
FIG. 8 is a graph showing a relationship between the vehicle speed and a duty ratio.

Meanwhile, when the second suppressing processing is being executed (namely, the process of step 625 of FIG. 6 is executed), the drive assistance ECU 22 obtains the duty ratio Rd by applying the vehicle speed Vt to a "relationship between the vehicle speed Vt and the duty ratio Rd" represented by a polygonal line Lx shown in FIG. 8.

As understood from FIG. 8, the duty ratio Rd is determined/obtained as follows based on the relationship shown in FIG. 8. Namely, when the vehicle speed Vt is smaller than the first speed V1, the duty ratio Rd is equal to a first ratio R1 (that is greater than 0 and is smaller than 1). When the vehicle speed Vt is within a range from the first speed V1 to the upper limit speed Vu, the duty ratio Rd decreases in a range from the first ratio R1 to "0" as the vehicle speed Vt increases. When the vehicle speed Vt is greater than the upper limit speed Vu, the duty ratio Rd is equal to "0." Furthermore, the drive assistance ECU 22 controls the signal control apparatus 91 on the basis of that duty ratio Rd in step 620 of FIG. 6.

Therefore, according to the second embodiment, when the first suppressing processing is being executed, the drive torque Dt is "0." When the vehicle speed Vt is smaller than the upper limit speed Vu while the second suppressing processing is being executed, the drive torque Dt is greater than "0" (and is smaller than the required acceleration Dre obtained on the basis of the actual accelerator operation amount Ap and the required acceleration map of FIG. 2). When the vehicle speed Vt is equal to or greater than the upper limit speed Vu while the second suppressing processing is being executed, the drive torque Dt is "0."

As having been described above, according to the first assistance apparatus and the second assistance apparatus, when the accelerator erroneous operation has occurred for the first time (namely, the erroneous operation start condition has become satisfied after a time point at which the second time threshold Tth2 elapsed from a time point at which the erroneous operation end condition became satisfied), the first suppressing processing is executed, so that a rapid acceleration of the vehicle 10 is prevented. In addition, when the accelerator erroneous operation has occurred repeatedly (namely, the repeated erroneous operation condition has become satisfied), the second suppressing processing is executed, so that the rapid acceleration of the vehicle 10 is prevented while the drive torque Dt can increase as compared with (or unlike) the case the first suppressing processing was executed.

Accordingly, even if it is determined that each of the accelerator operations performed multiple times by the driver according to the driver's intention is the accelerator erroneous operation, the acceleration Ac increases when the driver ends the first (previous) accelerator operation and restarts the (second/new) accelerator operation, as compared with the case that first accelerator operation was performed. Accordingly, a strong sense of discomfort which the driver may have can be avoided, even if it is determined that each of the accelerator operations performed multiple times by the driver according to the driver's intention is the accelerator erroneous operation.

Furthermore, when the vehicle speed Vt becomes greater than the upper limit speed Vu while the second suppressing processing is being executed, the drive torque Dt decreases as compared with (or is made to be a value smaller than one in) a case where the vehicle speed Vt is smaller than the upper limit speed Vu. Therefore, an unnecessary increase in the vehicle speed Vt can be avoided, even when the accelerator erroneous operations has occurred repeatedly.

The embodiments of the driving assistance apparatus according to the present disclosure have been described; however, the present disclosure is not limited to the above-described embodiments, and various modifications are possible without departing from the scope of the disclosure. For example, according to the first assistance apparatus and the second assistance apparatus, the erroneous operation start condition is the same as the second condition.

However, the erroneous operation start condition may be a condition different from the second condition. For example, the erroneous operation start condition may be a condition equal to the first condition. Namely, it may be determined that the erroneous operation start condition becomes satisfied when the accelerator operation speed As becomes greater than the operation speed threshold Asth. Alternatively, the erroneous operation start condition may be a condition that becomes satisfied when the accelerator operation amount Ap becomes greater than a predetermined fourth operation amount threshold Ath4 in a period from a starting time point at which the accelerator operation amount Ap became greater than a predetermined third operation amount threshold Ath3 that is smaller than the fourth operation amount threshold Ath4 to a time point at which the first time threshold Tth1 elapses from the starting time point.

In addition, according to the first embodiment, the limitation acceleration Ddc is set to "0" when the first suppressing processing is being executed. Furthermore, the limitation acceleration Ddc is obtained on the basis of the required acceleration map of FIG. 3 when the second suppressing processing is being executed. However, the limitation acceleration Ddc may be obtained (determined) on the basis of a method different from the above when the drive force suppressing processing is being executed. For example, the limitation acceleration Ddc may be obtained by multiplying the required acceleration Dre determined on the basis of the required acceleration map of FIG. 2 by a predetermined constant value Ka when the first suppressing processing is being executed, and the limitation acceleration Ddc may be obtained by multiplying the required acceleration Dre by a predetermined constant value Kb when the second suppressing processing is being executed. Notably, the constant value Ka is a value greater than "0" and smaller than "1" (as an example, Ka=0.1), and the constant value Kb is a value greater than the constant value Ka and smaller than "1" (as an example, Kb=0.5). Furthermore, when the vehicle speed Vt is equal to or greater than the upper limit speed Vu, the constant value Kb may be set (changed) to a value equal to the constant value Ka.

In addition, according to the first embodiment, the limitation acceleration Ddc is set to "0" when the vehicle speed Vt is equal to or greater than the upper limit speed Vu while the second suppressing processing is being executed. In other words, the limitation acceleration Ddc obtained when the vehicle speed Vt is equal to or greater than the upper limit speed Vu during the execution of the second suppressing processing is equal to the limitation acceleration Ddc during the execution of the first suppressing processing. However, when the second suppressing processing is being executed, the limitation acceleration Ddc may always be set to the first acceleration D1 regardless of the vehicle speed Vt.

In addition, according to the second embodiment, the drive assistance ECU 22 receives the vehicle speed signal output by the vehicle speed sensor 61. However, the drive assistance ECU 22 may not be configured to receive the vehicle speed signal. In this case, the drive assistance ECU 22 may set the duty ratio Rd to the first ratio R1 regardless of the vehicle speed Vt when the second suppressing processing is being executed.

In addition, according to the first embodiment and the second embodiment, the drive control ECU 23 obtains the target acceleration Dtg and controls the drive torque Dt on the basis of that obtained target acceleration Dtg. However, the drive control ECU 23 may be configured to obtain a target drive torque Ttg and to control the engine actuators 72 and the transmission 52 such that an actual value of the drive torque Dt coincides with the target drive torque Ttg. In this case, at least when the drive force suppressing processing is not being executed, the drive control ECU 23 obtains the target drive torque Ttg such that the target drive torque Ttg increases as the accelerator operation amount Ap increases. Furthermore, when the drive force suppressing processing is being executed, the thus configured drive control ECU 23 obtains the target drive torque Ttg such that the target drive torque Ttg is smaller than the target drive torque Ttg obtained when the drive force suppressing processing is not being executed.

In addition, according to the first embodiment, the drive control ECU 23 executes the target acceleration obtainment processing so as to obtain the target acceleration Dtg. The drive assistance ECU 21 obtains the limitation acceleration Ddc when the drive force suppressing processing is being executed. However, the drive control ECU 23 may be configured to execute the target acceleration obtainment processing so as to obtain (determine) a target throttle valve opening Vde which is a target value of a throttle valve opening Vr for the throttle valve actuator included in the engine actuators 72.

In this case, the drive control ECU 23 controls the throttle valve actuator such that an actual value of the throttle valve opening Vr coincides with the target throttle valve opening Vde, to thereby control the drive force of the vehicle 10. In addition, the drive assistance ECU 21 makes the drive control ECU 23 control the throttle valve actuator such that the throttle valve opening Vr becomes "0" when the first suppressing processing is being executed. Furthermore, the drive assistance ECU 21 makes the drive control ECU 23 control the throttle valve actuator such that the throttle valve opening Vr becomes a value greater than "0" and smaller than the target throttle valve opening Vde obtained/determined when the second suppressing processing is being executed. In addition, the drive assistance ECU 21 may be configured to make the drive control ECU 23 control the throttle valve actuator such that the throttle valve opening Vr becomes "0" when the vehicle speed Vt is greater than the upper limit speed Vu while the second suppressing processing is being executed.

In addition, according to the first embodiment and the second embodiment, when the accelerator operation amount Ap is "0," the accelerator signal (namely, the voltage) is 0V. However, the accelerator operation amount sensor 62 may be configured such that the accelerator signal (namely, the voltage) is a predetermined voltage Va when the accelerator operation amount Ap is "0," and the accelerator signal increases in a range greater than the voltage Va as the accelerator operation amount Ap increases. In this case, the drive control ECU 23 determines that the accelerator operation amount Ap is "0" when the signal control apparatus 91 is in the OFF state (namely, the accelerator signal is 0V).

In addition, according to the second embodiment, the OFF state of the signal control apparatus 91 is realized by interrupting the accelerator signal output by the accelerator operation amount sensor 62. However, the OFF state of the signal control apparatus 91 may be realized by outputting a predetermined "substitution signal" to the drive control ECU 23. In this case, the drive control ECU 23 sets the target acceleration Dtg to "0" when the substitution signal is received from the signal control apparatus 91.

In addition, according to the first embodiment and the second embodiment, the vehicle 10 is equipped with the engine 51 as a drive force generator (or drive force generating apparatus). However, the vehicle 10 may be equipped with an electric motor as the drive force generating apparatus instead of or in addition to the engine 51.

In addition, according to the second embodiment, the drive assistance ECU 22 consists of the ECU. However, the drive assistance ECU 22 may consist of a portable general-purpose computer.

In addition, the functions realized by the drive assistance ECU 21 in the first embodiment may be realized by a plurality of ECUs. Similarly, the functions realized by the drive assistance ECU 22 in the second embodiment may be realized by a plurality of ECUs.

What is claimed is:
1. A driving assistance apparatus comprising:
an accelerator pedal operated by a driver of a vehicle;
an accelerator operation amount sensor configured to detect an accelerator operation amount which is an operation amount of said accelerator pedal; and
a control unit implemented by at least one programmed processor and configured to control a drive force gen- erating apparatus which generates a drive force of said vehicle to thereby change said drive force;

wherein said control unit is configured to:

determine, based on said accelerator operation amount, whether a predetermined erroneous operation start condition becomes satisfied, said erroneous operation start condition being a condition to become satisfied when there is a probability that said driver has performed an erroneous operation to said accelerator pedal;

determine, based on said accelerator operation amount, whether a predetermined erroneous operation end condition becomes satisfied in a case where said erroneous operation start condition has been determined to become satisfied, said erroneous operation end condition being a condition to become satisfied when there is a probability that said erroneous operation to said accelerator pedal has ended;

control said drive force generating apparatus such that said drive force coincides with an ordinary drive force which varies depending on said accelerator operation amount during an ordinary period other than an erroneous operation period which is a period from a time point when said erroneous operation start condition becomes satisfied to a time point when said erroneous operation end condition becomes satisfied; and control said drive force generating apparatus such that said drive force coincides with an erroneous operation coping drive force which is smaller than said ordinary drive force during said erroneous operation period, wherein, said control unit is further configured to:

set said erroneous operation coping drive force to a first drive force which is smaller than said ordinary drive force, in a case where said erroneous operation start condition becomes satisfied after a reoperation determination time point at which a predetermined time threshold elapses from a time point when said erroneous operation end condition became last satisfied;

set said erroneous operation coping drive force to a second drive force which is greater than said first drive force and is smaller than said ordinary drive force, in a case where said erroneous operation start condition becomes satisfied before said reoperation determination time point;

set said erroneous operation coping drive force to said second drive force when a travelling speed of said vehicle is equal to or lower than a predetermined upper limit speed during said erroneous operation period in a case where said erroneous operation start condition becomes satisfied before said reoperation determination time point; and set said erroneous operation coping drive force to zero when said travelling speed of said vehicle is greater than said predetermined upper limit speed during said erroneous operation period in a case where said erroneous operation start condition becomes satisfied before said reoperation determination time point.

2. The driving assistance apparatus according to claim 1, wherein said control unit is configured to determine that said erroneous operation start condition becomes satisfied when at least a first condition becomes satisfied, said first condition being a condition satisfied when an increase amount of said accelerator operation amount per unit time becomes greater than a predetermined operation speed threshold.

3. The driving assistance apparatus according to claim 1, wherein said control unit is configured to determine that said erroneous operation start condition becomes satisfied when at least a second condition becomes satisfied, said second condition being a condition satisfied when said accelerator operation amount becomes greater than a predetermined first operation amount threshold in a period from a time point at which an increase amount of said accelerator operation amount per unit time becomes greater than a predetermined operation speed threshold to a time point at which a predetermined first time threshold elapses from said time point at which said increase amount of said accelerator operation amount per unit time becomes greater than said predetermined operation speed threshold.

4. The driving assistance apparatus according to claim 3, wherein said control unit is configured to determine that said erroneous operation end condition becomes satisfied when at least a third condition becomes satisfied, said third condition being a condition satisfied when said accelerator operation amount becomes smaller than a predetermined second operation amount threshold which is smaller than said first operation amount threshold.

* * * * *